United States Patent [19]
Chang et al.

[11] Patent Number: 6,044,186
[45] Date of Patent: Mar. 28, 2000

[54] FIBER OPTIC SWITCHING APPARATUS AND METHOD

[75] Inventors: Chin L. Chang, Walnut; Chao Yung Yeh, Rosemead; Michel K. Smith, Cerritos; Keyth M. Smith, Mission Hills; Ricardo A. Rosette, Oxnard; Robert Straede, Woodland Hills, all of Calif.

[73] Assignee: Lightwave Link, Burbank, Calif.

[21] Appl. No.: 09/086,784

[22] Filed: May 28, 1998

[51] Int. Cl.$^7$ ...................................................... G02B 6/26
[52] U.S. Cl. ................................. 385/23; 385/16; 385/22
[58] Field of Search ................................. 385/23, 16, 17, 385/18, 19, 20, 21, 22

[56] References Cited

U.S. PATENT DOCUMENTS

| | | | |
|---|---|---|---|
| 4,896,935 | 1/1990 | Lee ......................................... | 350/96.2 |
| 5,035,482 | 7/1991 | Ten Berge et al. ........................ | 385/17 |
| 5,098,207 | 3/1992 | Blomgren ................................... | 385/16 |
| 5,757,991 | 5/1998 | Harman ..................................... | 385/16 |

OTHER PUBLICATIONS

Shiraishi et al. Journal of Lightwave Technology Beam Expanding Fiber Using Thermal Diffusion of the Dopant vol. 8, No. 8, pp. 1151–1161 Aug. 1990.

Chen et al. Multi wavelength dynamically selective cross-connect based on fiber Bragg gratings and optical switches pp. 319–320 No Month 1998.

*Primary Examiner*—Phan T. H. Palmer
*Attorney, Agent, or Firm*—Lynn & Lynn

[57] ABSTRACT

A fiber optic switching apparatus includes a first fiber alignment head having a V-groove formed therein. A first optical fiber is mounted in the V-groove with an end of the first optical fiber being arranged to be spaced apart from an end of the V-groove. A second fiber alignment head is arranged to be adjacent the first fiber alignment head. The second fiber alignment head includes a switching member arranged to be pivotable between a first position and a second position. A second optical fiber is connected to the switching member with the second optical fiber being arranged to have an end extending into the V-groove such that the ends of the first and second optical fibers are in longitudinal alignment when the switching member is in its first position and being out of alignment when the switching member is in its second position. The second optical fiber preferably is arranged such that when the switching member is in the first position, a portion of the second optical fiber is bent so that elastic forces in the first optical fiber retain it in the first position in the V-groove.

7 Claims, 3 Drawing Sheets

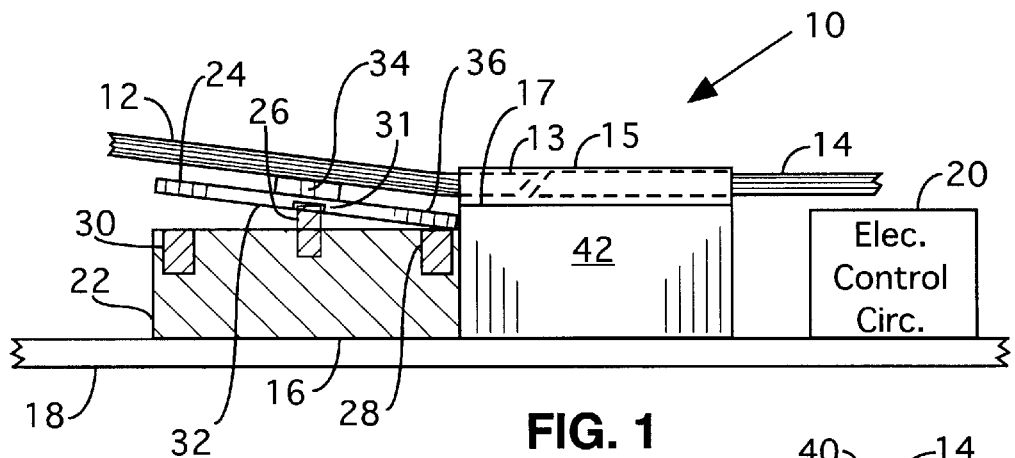
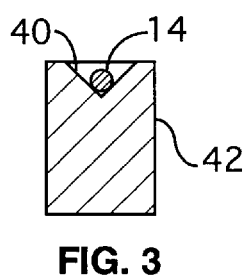
FIG. 3
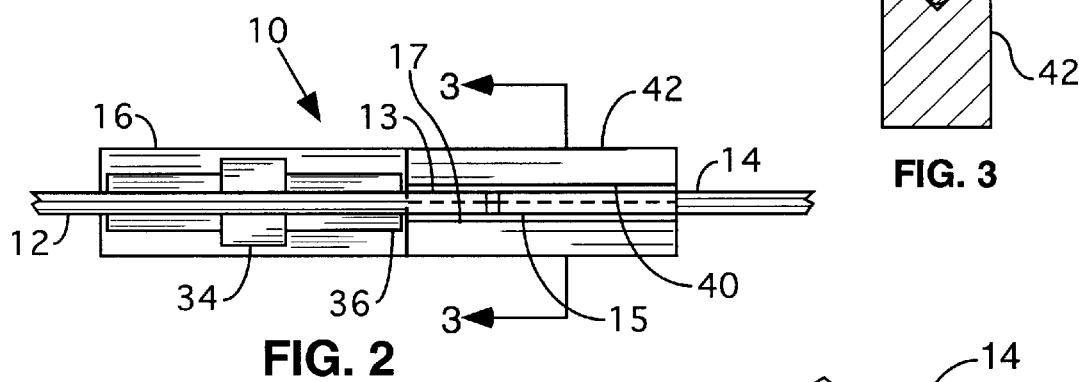
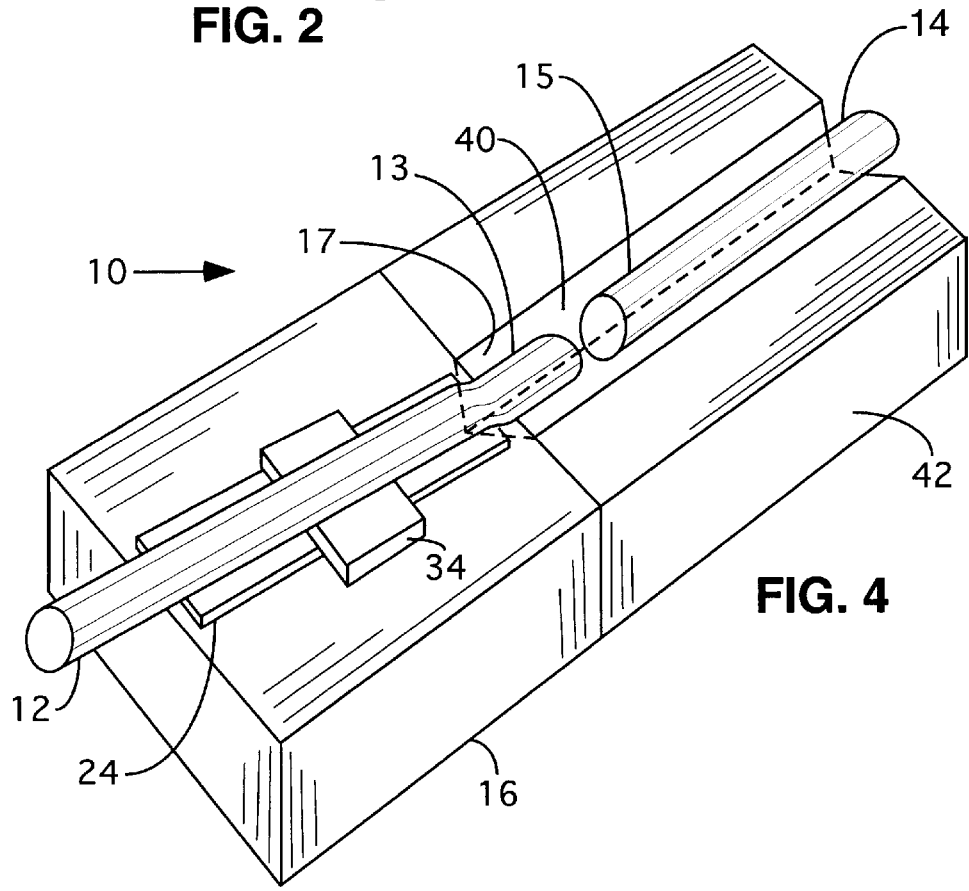

FIBER OPTIC SWITCHING APPARATUS AND METHOD

BACKGROUND OF THE INVENTION

This invention relates generally to fiber optic communications systems. This invention relates particularly to an apparatus and a method for coupling optical signals from one optical fiber into another optical fiber.

Fiber optic communications systems employ optical fibers for carrying communications signals because such systems have the capability of carrying signals on a large number of channels. Such systems are necessary for meeting the demand for communications channels.

Another advantage of optical fiber communications systems is that fiber optic transmission lines are capable of guiding signals for both voice and video transmission in real time. Accordingly, optical fiber is finding increasing use in applications such as monitoring automatic teller machines and video conferencing.

A fiber optic communications system includes switching stations so that communications signals may be routed between any two locations in the network. Each switching station switches signals carried by one optical fiber to a selected one of a plurality of optical fibers for transmission to another switching station in the network.

Systems for switching optical signals between optical fibers include apparatus for placing the fibers end-to-end so that light may be coupled out of one fiber into the other. Direct coupling between single mode fibers is not practical. Therefore lenses are typically used at the ends of the fiber. A first lens expands the light beam output from one of the fibers. A second lens collects the beam output from the first lens and focuses it on the end of the second optical fiber. The use of lens elements makes the coupling device complicated, large, unstable and expensive and requires critical alignment. As other light crosses each interface between media having different refractive index, signal loss occurs due to reflections.

The switching station should be highly reliable and have low insertion loss and high return loss. Insertion loss reduces signal strength, whereas returned, or reflected, signals cause cross talk. The fiber ends must be axially sand laterally aligned and must be spaced apart by only a very small distance to meet the operational requirements.

Some present fiber optic switching stations us e robots to move the fiber from which a signal is to be extracted to a selected contact point where the signals is coupled into another optical fiber. Robots for this purpose are very expensive and have problems with repeatability in placing, the fibers in positions where signals may be satisfactorily extracted from one optical fiber and input into another. Robots are also slow and have limitations on the number of fiber optic channels that may be used.

Other prior art switching apparatus (e.g. U.S. Pat. No. 4,896,935) uses a stepping motor to place the fibers in alignment for signal transmission. Stepping motors have the disadvantages of poor resolution, non-uniform stepping and thermal sensitivity.

Another prior art switching apparatus has an input fiber mounted on a magnetic base that may be pivoted to direct signals from the input fiber to a selected one of two output fibers. The base is arranged adjacent a pair of longitudinally aligned solenoids. Electrical switching apparatus energizes one of the solenoids to move the end of the input fiber into alignment with the output fiber corresponding to the solenoid. The input fiber includes a lens that directs the optical signals to corresponding lenses at the ends of the output fibers. This device has the drawbacks associated with the use of lenses to couple optical signals between the ends of optical fibers. Other disadvantage of this device are that the solenoids are large and that the device readily mountable on a printed circuit board.

SUMMARY OF THE INVENTION

The present invention overcomes problems associated with the prior art by a providing a highly reliable fiber optic switching device that requires no lenses or stepping motors. The fiber optic switching device according to the present invention has low insertion loss and high return loss, which makes the invention ideal for use in communications applications. The present invention further has high switching speed, low power consumption, small size and a wide operating temperature range. Accordingly, the present invention is suitable for use in applications such as real-time monitoring automatic teller machine networks, redundancy and backup for fiber distributed interfaces and component testing.

A fiber optic switching apparatus according to the present invention comprises a first fiber alignment head having a V-groove formed therein. A first optical fiber is mounted in the V-groove with an end of the first optical fiber being arranged to be spaced apart from an end of the V-groove. A second fiber alignment head is arranged to be adjacent the first fiber alignment head. The second fiber alignment head includes a switching member arranged to be pivotable between a first position and a second position. A second optical fiber is connected to the switching member with the second optical fiber being arranged to have an end extending into the V-groove such that the ends of the first and second optical fibers are in longitudinal alignment when the switching member is in its first position and being out of alignment when the switching member is in its second position.

The second optical fiber preferably is arranged such that when the switching member is in the first position, a portion of the second optical fiber is bent so that elastic forces in the first optical fiber retain it in the first position in the V-groove.

The second fiber alignment head preferably comprises an electromechanical relay that includes a housing, apparatus for pivotally mounting the switching member in the housing, and apparatus arranged to latch the switching member such that the first and second optical fiber ends are selectively either in or out of alignment.

A fiber optic switching apparatus according to the present invention may further comprise a third fiber alignment head that is substantially identical to the first fiber alignment head. A third optical fiber is mounted in the V-groove in the third fiber alignment head with the third fiber alignment head being mounted to the second fiber alignment head with their V-grooves in facing relationship. The first and third optical fibers are arranged such that when the switching member is in its first position, the first and second optical fiber ends are aligned in the V-groove in the first fiber alignment head and when the switching member is in its first position, the first and third optical fiber ends are aligned in the V-groove in the third fiber alignment head.

An appreciation of the objectives o f th e present invention and a more complete understanding of its structure and method of operation may be had by studying the following description of the preferred embodiment and by referring to the accompanying drawings.

BRIEF DESCRIPTION OF THE DRAWINGS

FIG. 1 is a side elevation view of a 1×1 fiber optic switching apparatus formed according to the present invention showing an input fiber arranged to provide an optical signal to an output fiber;

FIG. 2 is a top plan view of t he apparatus of FIG. 1;

FIG. 3 is a cross sectional view of the apparatus of FIGS. 1 and 2 taken along line 3—3 of FIG. 2;

FIG. 4 is a perspective view of the fiber optic switching apparatus of FIGS. 1–3;

DESCRIPTION OF THE PREFERRED EMBODIMENT

Figure 5:
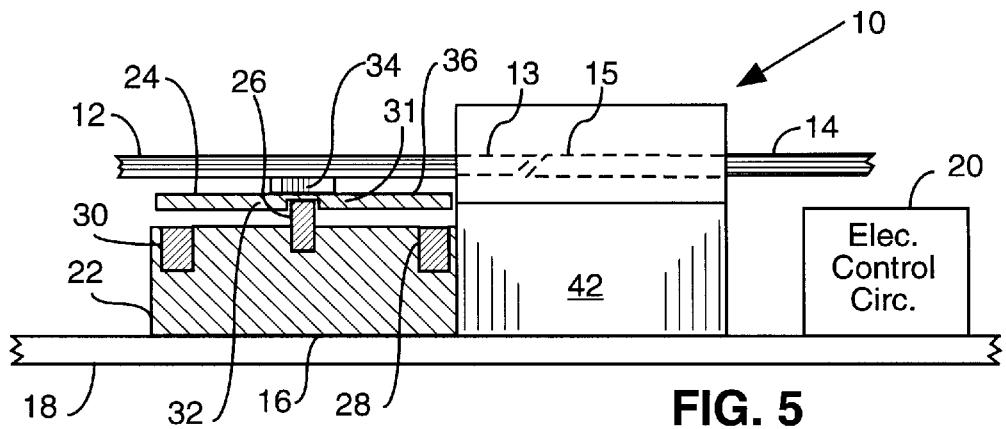
FIG. 5 is a side elevation view of the apparatus of FIG. 1 showing the input and output fibers arranged to be parallel.
Figure 6:
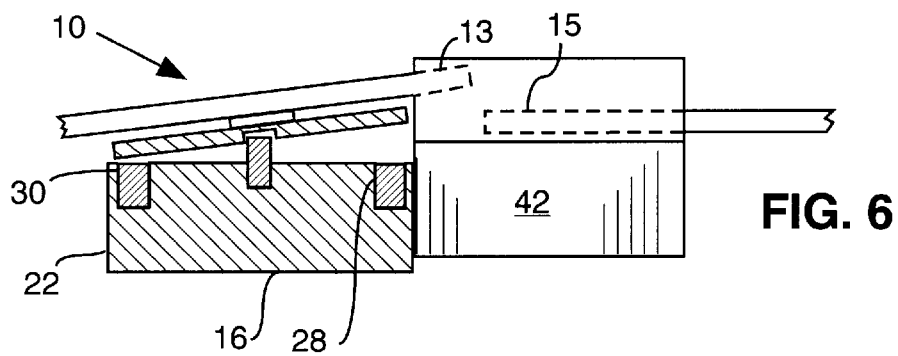
FIG. 6 is a side elevation view showing a 1×1 fiber optic switching apparatus according to the present invention in its off configuration.

This disclosure describes an apparatus and a method for making and using an improved fiber optic switching or coupling apparatus for applications such as cornmunications systems. Specific details are disclosed to provide a through description of the invention. However, it will be apparent that the present invention may be practiced without these specific details. Well-known components of the fiber optic switching apparatus according to the present invention are shown in simplified form, rather than in detail, to avoid unnecessarily obscuring the invention.

FIG. 1 illustrates a fiber optic switching apparatus 10 according to the present invention. The fiber optic switching apparatus 10 is a 1×1 switching apparatus having an on state and an off state. In the on state the fibers 12 and 14 are aligned so that optical signals are directed from a signal input fiber 12 to a signal output fiber 14. In the off state the fibers 12 and 14 are not in alignment so that optical signals emitted from the end of the input fiber 12 are not directed to the end of the output fiber 14.

The position of the input fiber 12 is controlled by a relay 16. The relay 16 preferably is a well-known type of relay widely used in telephone switching apparatus. As such, the relay 16 is formed to be mounted to a printed circuit board 18 to facilitate application of control signals from an electronic control circuit 20. Portions of the structure of the relay 16 that are used in the present invention are described below. It should be noted that the relay 16 is included in a presently preferred embodiment of the invention for controlling the position of the input fiber 12. The invention is not limited to the use of the relay 16. The invention may be practiced with other apparatus for controlling position of the end 13 of the input fiber 12. It should be noted that drawings illustrating the relay 16 and other components of the invention are not scale. Dimensions of various components are adjusted to illustrate the principles of the invention.

The relay 16 includes a housing 22 that is formed generally as a hollow box having rectangular sides. The length of the relay housing 22 is about 14 mm and its height and width are about 8 mm and 10 mm, respectively. The relay 16 includes a switching member 24 formed generally as a thin elongate rectangle made of a ferromagnetic material. The central portion of the switching member 24 is mounted on a pivoting device 26 for pivoting movement between a pair of electromagnets 28 and 30. The pivoting device 26 preferably is a generally rectangular permanent magnet that extends into a similarly-shaped recess 31 in the center of a surface 32 of the switching member.

The typical structure of the relay 16 includes a thin rectangular insulator 34 used to mount electrical conductors (not shown) to the switching member 24. The insulator 34 extends a small distance above the plane of the rectangular switching member 24. The input fiber 12 preferably is mounted to the insulator 34 and arranged to be parallel to the length of the switching member 24.

Application of an electrical signal from the electronic control device 20 to the electromagnet 28 attracts the end 36 of the switching member 24 to the electromagnet 28 to place the switching member 24 and the input fiber 12 in the "down" position shown in FIG. 1.

The output fiber 14 preferably is mounted in a V-groove 40 formed lengthwise in a fiber retainer 42. The fiber retainer 42 preferably is formed as a block having generally rectangular surfaces. The length of the fiber retainer is about 11 mm so that the total length of the fiber optic switching apparatus 10 is about 25 mm. The height of the fiber retainer is about 8 mm, and its width is about 10 mm.

As shown in FIGS. 1 and 2, the output fiber 14 extends over about three-fourths of the length of the V-groove 40. The output fiber 14 is secured in the V-groove by a suitable adhesive as is well-known in optical fiber technology.

The electro-optical, electrical and mechanical and environmental characteristics of the fiber optic switching apparatus 10 are summarized in Tables I, II and III, respectively.

The input fiber 12 is mounted to the relay 16 so that the end of the input fiber 12 extends into the V-groove 40 adjacent the end 15 of the output fiber 14 when the input fiber is in the down position of FIG. 1. When the ends of the input fiber 12 and the output fiber 14 are adjacent as shown in FIG. 1, optical signals will couple from the end 13 of the input fiber 12 into the end 15 of the output fiber 14. The ends 13 and 15 preferably are coated to reduce reflections. As shown in FIG. 1, the ends 13 and 15 are cleaved at angles, which prevents any light that may be reflected at the ends 13 and 15 from being propagated in the reverse direction in the input fiber 12.

A noteworthy feature of the fiber optic switching apparatus 10 is that the input fiber end 13 extends a few millimeters into the V-groove 40 when the relay 16 is in the down position of FIG. 1. The input and output fibers are mounted such that when the relay 16 is in the down position, the end 15 of the input fiber 12 is pressed into the V-groove 40. When the input fiber 12 and output fiber 14 are parallel, the input fiber 12 is displaced from the output fiber by a small distance as shown in FIG. 4. The fibers 12 and 14 are arranged so that when the input fiber is lowered into the V-groove 40, the end segment of the input fiber is aligned end-to-end with the output fiber 14 with elastic forces in the fiber 12 applying a downward force to keep the end of the output fiber 12 in the V-groove 40.

The input fiber 12 has two degrees of freedom when it is not in the V-groove 40. Mere placement of the input fiber 12 in the V-groove 40 could allow the fiber end 13 to move away from the bottom of the V-groove 40 in response to vibrations or the like. Exerting a force on the input fiber end 13 keeps it the desired position to maintain constant signal transmission to the output fiber 14.

Figure 7:
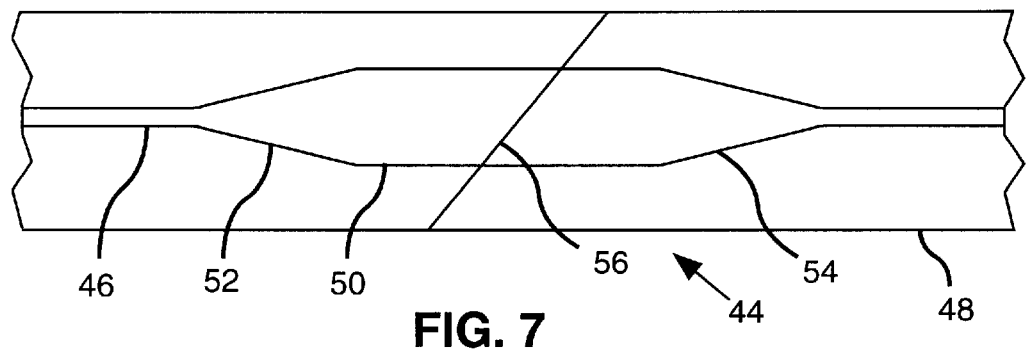
FIG. 7 is a cross sectional view showing the core and cladding of a beam expanded single mode optical fiber.

The present invention may be practiced with either ordinary optical fiber or beam expanded fiber. FIG. 7 illustrates a modification of a single mode optical fiber to improve end-to-end coupling. Referring to FIG. 7, an optical fiber 44 has a core 46 and a cladding 48. Because of the difference between core and cladding diameters, the optical fiber 44 is not drawn to any scale. Optical signals are guided by the core because of total internal reflection at the core/cladding interface.

The core 46 is a germanium-doped region of the optical fiber 44 having a normal diameter of about 9 μm. The cladding diameter of a typical single mode optical fiber is about 125 μm. The core diameter at a region 50 of the optical fiber 44 is expanded by applying heat thereto, which causes the germanium dopant to migrate radially outward. It has been found that application of heat with a microbuner to heat the core region 50 to a temperature of about 1250° C. for ten to fifteen minutes expands the diameter of the core region 50 to about 30 μm.

Heat is applied so that the core region 50 tapers at its ends 52 and 54. Tapering the ends 52 and 54 of the core region 50 causes optical signals to propagate from the 9 μm diameter normal region of the core 46 to the 30 μm a diameter region 50 without substantial end reflection. Therefore, there is virtually no loss of signal intensity when the diameter of the beam guided by the optical fiber 60 expands from 9 μm to 30 μm.

The fiber 44 is then cleaved with an angled end facet along a line 56 near the midpoint of the expanded core region 50. The fiber is cleaved along an angle to minimize back reflection. For many sensitive fiber optic systems back reflection can induce excessive noise and laser instability. Cleaving the end of the fiber at an angle faces reduces backward propagation of end face reflections. Properly choosing the cleave angle can reduce back reflections to less than −60 dB.

Figure 8:
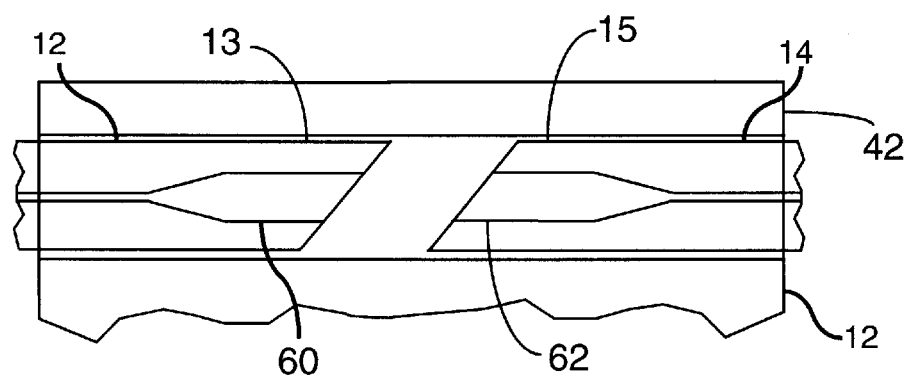
FIG. 8 is an enlarged cross sectional view showing end-to-end alignment of a pair of beam expanded single mode optical fibers.

The process described above may be used to form the fiber end 13 in the input fiber 12 and the end portion 15 of the output fiber 14. FIG. 8 is an expanded view of a portion of the alignment head 42 showing the input optical fiber end seμment 13 aligned with the output optical fiber end 15. In the embodiment of FIG. 1, both of the optical fibers 12 and 14 beam expanded single mode fibers of the type described above. The use of beam expanded fibers has significant advantages over normal single mode optical fiber. One advantage is that light will propagate out of the input fiber end 13 into the output fiber end 15 without requiring any lenses. Another advantage is that with a core diameter of 30 μm, the diameter of the beam output from the input fiber end 13 is sufficiently large that a lateral misalignment of about 6 μm is permissible.

Figure 9:
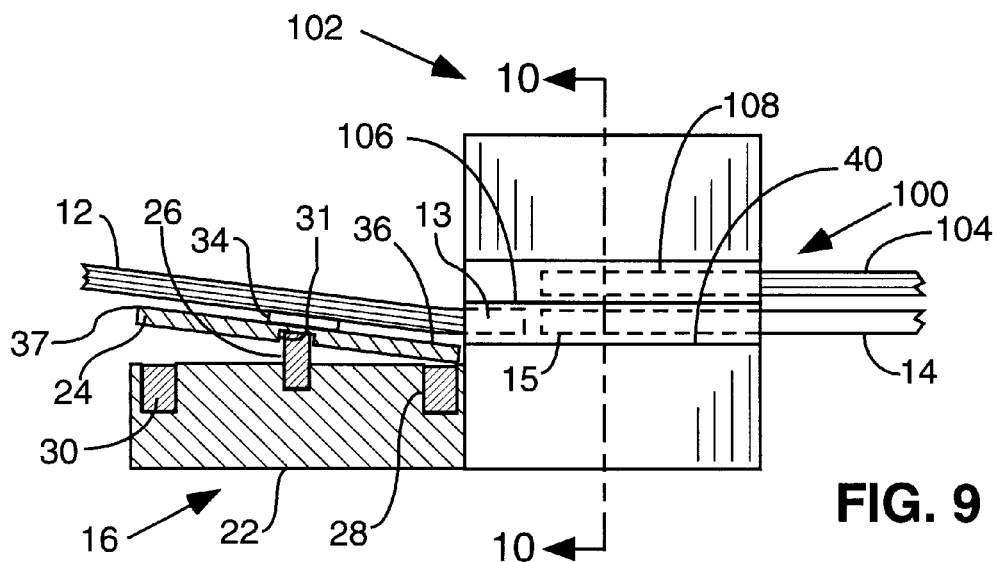
FIG. 9 is a side elevation view of a 1×2 fiber optic switching apparatus formed according to the present invention showing an input optical fiber arranged to provide an optical signal to a first output fiber.

FIG. 9 illustrates a 1×2 fiber optic switching apparatus 100 according to the present invention. The fiber optic switching apparatus 100 includes the structure of FIGS. 1–4 in combination with a second alignment head 102 and a second output fiber 104. The components of the fiber optic switching apparatus 10 that are included in the fiber optic switching apparatus 100 have the same reference numerals as in FIGS. 1–4. The printed circuit board 18 and electrical control device are not shown in the illustrations of the fiber optic switching apparatus 100. It is to be understood that all embodiments of the present invention are designed to be used with some type of electrical control apparatus, the details of which are not a part of the invention.

Figure 10:
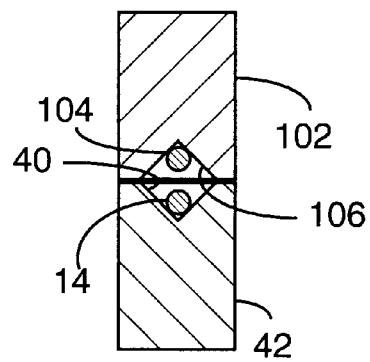
FIG. 10 is a cross sectional view taken along line 10—10 of FIG. 9.
Figure 11:
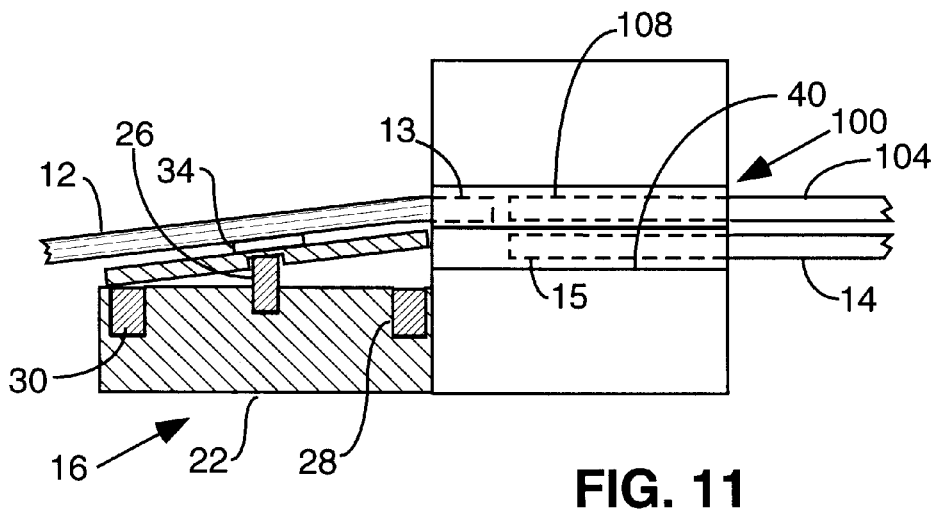
FIG. 11 is a side elevation view of the 1×2 fiber optic switching apparatus showing the input fiber arranged to provide an optical signal to a second output fiber.

Referring to FIGS. 9–11, the second fiber alignment head is formed to be essentially identical to the first alignment head 42. The second output fiber 104 is secured within a second V-groove 106. The second output fiber 104 preferably has a beam expanded end portion 108. The first fiber alignment head 42 and the second fiber alignment head 102 are connected together so that the V-grooves 40 and 106 are parallel and facing one another. An adhesive preferably is used to connect the alignment heads together.

The 1×2 fiber optic switching apparatus 100 may be actuated to provide optical signals from the input fiber 12 to a selected one of the output fibers 14 or 104. Application of an electrical signal to the electromagnet 28 causes the switching member 24 to move the "down" position shown in FIG. 9 to align the input fiber end 13 with the output fiber end 15. In a latching embodiment of the invention, the electromagnet 28 has a residual magnetism sufficient to retain the end 36 of the switching member 24 in the down position in the absence of any control signal.

Application of a control signal to the electromagnet 30 causes the switching member 24 to pivot about its support to place the switching member 24 in an "up" position shown in FIG. 11. When the switching member is in the up position, the end 37 of the switching member 24 contacts the electromagnet 30. The residual magnetism of the electromagnet 30 latches the switching member 24 in the up position.

The second output fiber 104 is arranged in its V-groove 106 so that when the switching member 24 is in the up position, the input fiber end 13 is pressed into the V-groove 106 in the manner described previously with reference to the input fiber end 13 and the V-groove 40. As described previously, the input fiber 12 has a curved portion just outside the V-grooves 40 and 106 so that elastic forces in the fiber 12 retain the end 13 in contact with the sides of the V-groove 106 when the switching member 24 is in the "up" position. Therefore, application of control, or switching, signals to the relay 16 switches the optical output of the fiber optic switching apparatus 100 between the output fibers 14 and 104.

TABLE I

Electro-Optical Characteristics

| PARAMETER | 1 × 1 Switch | 1 × 2 Switch |
|---|---|---|
| Wavelength range (nm) | 1280–1650 | 1280–1650 |
| Insertion Loss (dB), max. | 1 | 1 |
| Return Loss (dB), typ. | 60 | 60 |
| Crosstalk (dB), min. | 60 | 60 |
| Switching Speed (ms), max. | 4 | 4 |
| Repeatability (dB), min. | 0.1 (>$10^7$ cycles) | 0.1 (>$10^7$ cycles) |

TABLE II

Electrical Characteristics

| PARAMETER | 1 × 1 Switch | 1 × 2 Switch |
|---|---|---|
| Coil Resistance, (Ω) | 90–250 | 90–250 |
| Operating Current (mA), max. | 34 | 34 |
| Power Consumption (mW), max. | 100 | 100 |

TABLE III

Mechanical & Environmental Characteristics

| PARAMETER | 1 × 1 Switch | 1 × 2 Switch |
|---|---|---|
| Op. Temp. Range (° C.) | −40 to +85 | −40 to +85 |
| Relative Humidity | 35 to 85% | 35 to 85% |
| Fiber Pigtail | φ 0.9 mm (SM, 10/125) | φ 0.9 mm (SM, 10/125) |
| Dimensions (mm × mm × mm) | 25 (L) × 8 (H) × 10 (W) | 25 (L) × 8 (H) × 10 (W) |

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic switching apparatus, comprising:

a first fiber alignment head having a V-groove formed therein;

a first optical fiber mounted in the V-groove with an end of the first optical fiber being arranged to be spaced apart from an end of the V-groove;

a second fiber alignment head arranged to be adjacent the first fiber alignment head, the second fiber alignment head including a switching member that is arranged to be pivotable between a first position and a second position; and a second optical fiber connected to the switching member, the second optical fiber, the switching member and the V-groove being aligned such that when the switching member is in the first position a portion of the second optical fiber is bent such that elastic forces retain an end thereof in the V-groove such that the ends of the first and second optical fibers are in longitudinal alignment when the switching member is in its first position and are out of alignment when the switching member is in its second position.

2. A fiber optic switching apparatus, comprising:

a first fiber alignment head having a V-groove formed therein;

a first optical fiber mounted in the V-groove with an end of the first optical fiber being arranged to be spaced apart from an end of the V-groove;

a second fiber alignment head arranged to be adjacent the first fiber alignment head, the second fiber alignment head including a switching member that is arranged to be pivotable between a first position and a second position;

a second optical fiber connected to the switching member, the second optical fiber being arranged to have an end extending into the V-groove such that the ends of the first and second optical fibers are in longitudinal alignment when the switching member is in its first position and are out of alignment when the switching member is in its second position; and wherein the second fiber alignment head comprises an electromechanical relay that includes a housing, apparatus for pivotally mounting the switching member in the housing, and apparatus arranged to latch the switching member such that the first and second optical fiber ends are selectively either in or out of alignment.

3. A fiber optic switching apparatus, comprising:

a first fiber alignment head having a V-groove formed therein;

a first optical fiber mounted in the V-groove with an end of the first optical fiber being arranged to be spaced apart from an end of the V-groove;

a second fiber alignment head arranged to be adjacent the first fiber alignment head, the second fiber alignment head including a switching member that is arranged to be pivotable between a first position and a second position, and an electromechanical relay that includes a housing and apparatus for pivotally mounting the switching member in the housing;

a second optical fiber connected to the switching member, the second optical fiber, the switching member and the V-groove being aligned such that when the switching member is in the first position a portion of the second optical fiber is bent such that elastic forces retain an end thereof in the V-groove such that the ends of the first and second optical fibers are in longitudinal alignment when the switching member is in its first position and are out of alignment when the switching member is in its second position; and apparatus arranged to latch the switching member such that the first and second optical fiber ends are selectively either in or out of alignment.

4. The fiber optic switching apparatus of claim 3, further comprising electronic control means arranged for controlling the apparatus arranged to latch the switching member.

5. The fiber optic switching apparatus of claim 4 wherein the apparatus arranged to latch the switching member includes a pair of magnets arranged for moving the switching member to a selected position for controlling alignment of the first and second optical fibers.

6. A fiber optic switching apparatus, comprising:

a first fiber alignment head having a first V-groove formed therein;

a first optical fiber mounted in the first V-groove with an end of the first optical fiber being arranged to be spaced apart from an end of the first V-groove;

a second fiber alignment head arranged to be adjacent the first fiber alignment head, the second fiber alignment head including a switching member that is arranged to be pivotable between a first position and a second position;

a second optical fiber connected to the switching member, the second optical fiber being arranged to have an end extending into the first V-groove such that the ends of the first and second optical fibers are in longitudinal alignment when the switching member is in its first position and being out of alignment when the switching member is in its second position;

a third fiber alignment head that is substantially identical to the first fiber alignment head and having a second V-groove therein; and a third optical fiber mounted in the second V-groove, the third fiber alignment head being mounted to the second fiber alignment head with the first and second V-grooves in facing relationship, the first and third optical fibers being arranged such that when the switching member is in its first position, the first and second optical fiber ends are aligned in the first V-groove and when the switching member is in its second position, the first and third optical fiber ends are aligned in the second V-groove.

7. The fiber optic switching apparatus of claim 6 wherein the second optical fiber is arranged relative to the first and third optical fibers such that elastic forces in the second optical fiber retain it in the first V-groove when the switching member places the first and second optical fibers in alignment and retain the second optical fiber in the second V-groove the switching member places the first and third optical fibers in alignment.

* * * * *